(12) United States Patent
Blackburn et al.

(10) Patent No.: US 7,848,348 B2
(45) Date of Patent: Dec. 7, 2010

(54) SYSTEM AND METHOD FOR MANAGING NETWORK TRAFFIC

(75) Inventors: Stuart L. Blackburn, San Ramon, CA (US); Raghvendra Savoor, Walnut Creek, CA (US); John Van Slyke, Lafayette, CA (US); Xidong Wu, Livermore, CA (US); Baofeng Jiang, Pleasanton, CA (US); Kaiyan Chen, Pleasanton, CA (US); Sun-Uk Park, Union City, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 671 days.

(21) Appl. No.: 11/735,175

(22) Filed: Apr. 13, 2007

(65) Prior Publication Data

US 2008/0253393 A1 Oct. 16, 2008

(51) Int. Cl.
*H04L 12/40* (2006.01)
*H04J 3/16* (2006.01)
(52) U.S. Cl. .................. 370/449; 370/346; 370/468
(58) Field of Classification Search ......... 370/449–457, 370/346
See application file for complete search history.

(56) References Cited

U.S. PATENT DOCUMENTS

| 6,377,550 | B1* | 4/2002 | Prasad ................ 370/236.1 |
| 6,381,216 | B1* | 4/2002 | Prasad ................ 370/236.1 |
| 6,640,268 | B1* | 10/2003 | Kumar ................ 710/46 |
| 6,801,500 | B1* | 10/2004 | Chandran ............. 370/230.1 |
| 7,511,601 | B2* | 3/2009 | Eisenberg et al. ....... 340/3.51 |
| 2002/0196783 | A1 | 12/2002 | Takahashi |
| 2004/0236880 | A1* | 11/2004 | Barrett ................ 710/52 |
| 2005/0174938 | A1 | 8/2005 | Richardson et al. |
| 2007/0147330 | A1* | 6/2007 | Smith et al. .......... 370/346 |

\* cited by examiner

*Primary Examiner*—Thai D Hoang
(74) *Attorney, Agent, or Firm*—Pablo Meles; Ed Guntin; Guntin Meles & Gust, PLC

(57) ABSTRACT

A system and method for managing network traffic is disclosed. A system that incorporates teachings of the present disclosure may include, for example, a data switch having a controller element to transmit telemetry data representative of bandwidth usage by one or more users of the data switch. Traffic for the data switch can be managed based at least in part on the bandwidth usage by higher bandwidth users of the data switch. Additional embodiments are disclosed.

21 Claims, 4 Drawing Sheets

SYSTEM AND METHOD FOR MANAGING NETWORK TRAFFIC

FIELD OF THE DISCLOSURE

The present disclosure relates generally to communication systems, and more specifically to a system and method for managing network traffic.

BACKGROUND

As communication networks continue to grow at a rapid pace and continue to add more services, increased bandwidth usage is being seen. Data switches have limited bandwidth capacity and unchecked bandwidth usage can rapidly exhaust the capacity of the data switch. Counters are used on data switches to monitor bandwidth usage. However, these counters have a maximum counting limit before they rollover. A rollover of a counter occurring in the interval between collections of counting data can cause erroneous calculations of bandwidth usage for the data switch.

A need therefore arises for a system and method for managing network traffic.

DETAILED DESCRIPTION

Embodiments in accordance with the present disclosure provide a system and method for managing network traffic.

In a first embodiment of the present disclosure, a computer-readable storage medium in a network proxy of a communication system, can have computer instructions for polling a data switch according to a polling frequency to determine bandwidth usage of one or more users of the communication system; determining a peak bandwidth of each of the one or more users based at least in part on the bandwidth usage; identifying higher bandwidth users of the one or more users based at least in part on the peak bandwidth; and increasing the polling frequency for at least one of the higher bandwidth users to determine an estimated bandwidth usage and to avoid a rollover of a telemetry counter.

In a second embodiment of the present disclosure, a data switch can have a controller element to transmit telemetry data representative of bandwidth usage by one or more users of the data switch. Traffic for the data switch can be managed based at least in part on the bandwidth usage by higher bandwidth users of the data switch.

In a third embodiment of the present disclosure, a method of managing network traffic can involve monitoring bandwidth usage of one or more users of a data switch to at least in part avoid a rollover of a telemetry counter; and performing traffic management based at least in part on the bandwidth usage according to at least one among augmenting bandwidth of the data switch and transferring at least one of the one or more users to another data switch.

Figure 1:
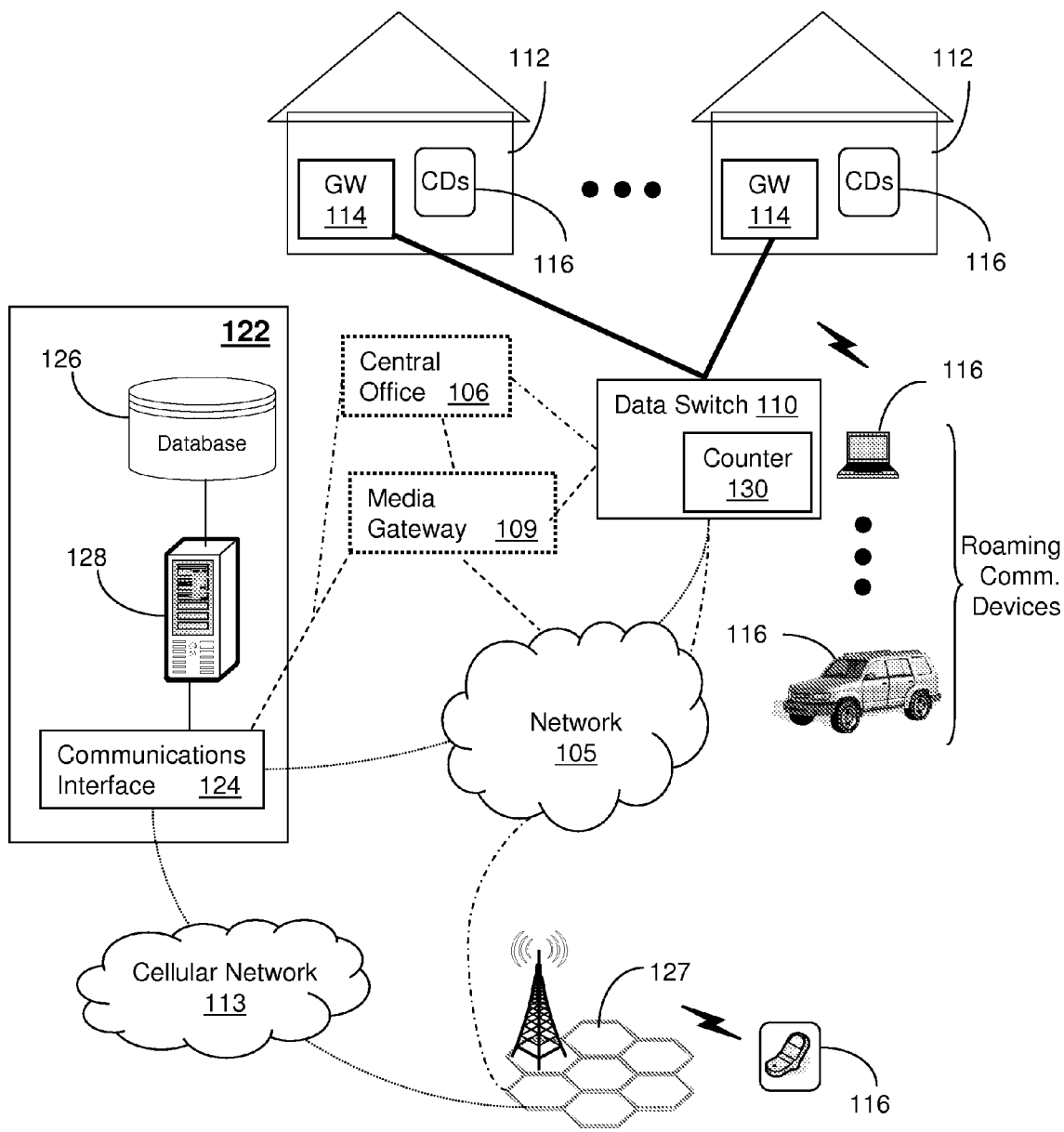
FIGS. 1 and 2 depict exemplary embodiments of a communication system.

FIG. 1 depicts an exemplary embodiment of a mobile communication device 116 communicating by way of wired and wireless access points (WAPs) with other communication devices and/or a network proxy 122 which collectively operate in a communication system 100. The communication device 116 can be a multimode VoIP terminal. However, the present disclosure contemplates the use of other types of communication devices, including other types of voice, video and data devices. The communication system 100 can comprise a packet-switched network 105. The packet-switched network can be an Internet Service Provider (ISP) network 105. The network 105 can be coupled to the network proxy 122, the cellular network 113 and network elements located in one or more of the buildings 112 representing an enterprise or residence. The ISP network 105 utilizes technology for transporting Internet traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106, the gateway 114 and a data switch 110. Communications between the network proxy 122, the communication devices 116 and other network elements of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the central office 106, the media gateway 109, the cellular network 113, the data switch 110 and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications, including MPLS.

Communication system 100 can comprise one or more data switches 110 or other network devices that can manage network traffic to one or more users, such as communication devices 116. The data switch 110 can be various network elements utilized for control of network traffic, including digital subscriber line access multipliers (DSLAMs), routers, and asynchronous transfer mode (ATM) switches. For illustration purposes, a single data switch 110 is shown as a stand-alone device. However, the present disclosure contemplates the data switch 110 being incorporated into other network elements. The present disclosure contemplates the use of a plurality of data switches 110 being utilized, which can each have one or more users associated therewith. The data switch 110 can be housed in the central office 106 or can be housed elsewhere, as shown in FIG. 1 for illustrative purposes.

The data switch 110 can have a counter 130 or other device for monitoring and/or collecting telemetry data for the data switch 110 and/or for the one or more users of the data switch. The telemetry data can include bandwidth usage of the data switch 110 and/or bandwidth usage of the one or more users of the data switch. The present disclosure illustrates the counter 130 being coupled with or incorporated into the data switch 110. However, one of ordinary skill in the art would recognize that the counter can be otherwise configured with the data switch 110, such as a stand alone device that can be positioned in proximity to or remote from the data switch. In one embodiment, the counter 130 can be provided on another network element that is used for monitoring the bandwidth usage of the data switch 110 and/or the one or more users of the data switch.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

Figure 2:
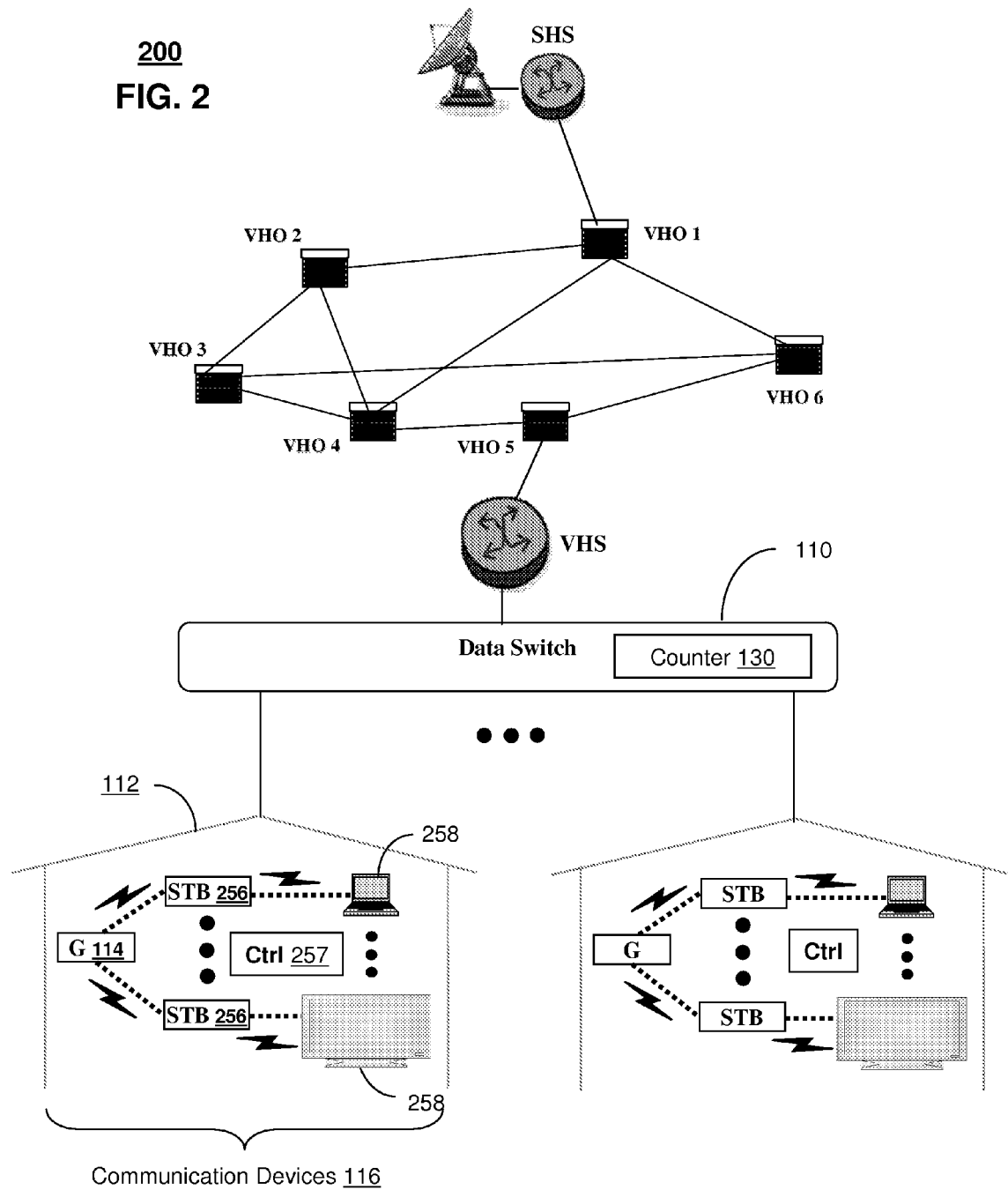

FIG. 2 depicts an exemplary embodiment of a communication system 200 embodying an IPTV service. Communication system 200 can be overlaid or operably coupled with communication system 100 as another representative embodiment of communication system 100. In a typical IPTV backbone, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 112 housing the gateway 114 (e.g., a residential gateway or RG) that distributes broadcast signals to receivers such as Set-Top Boxes (STBs) 256 which in turn present broadcast selections or media programs to media devices 258 such as computers or television units managed in some instances by a media controller 257 (e.g., an infrared or RF remote control).

Unicast traffic can also be exchanged between the STBs 256 and the subsystems of the IPTV communication system 200 for services such as video-on-demand (VoD). Although not shown, the aforementioned multimedia system can also be combined with analog broadcast distributions systems.

Figure 3:
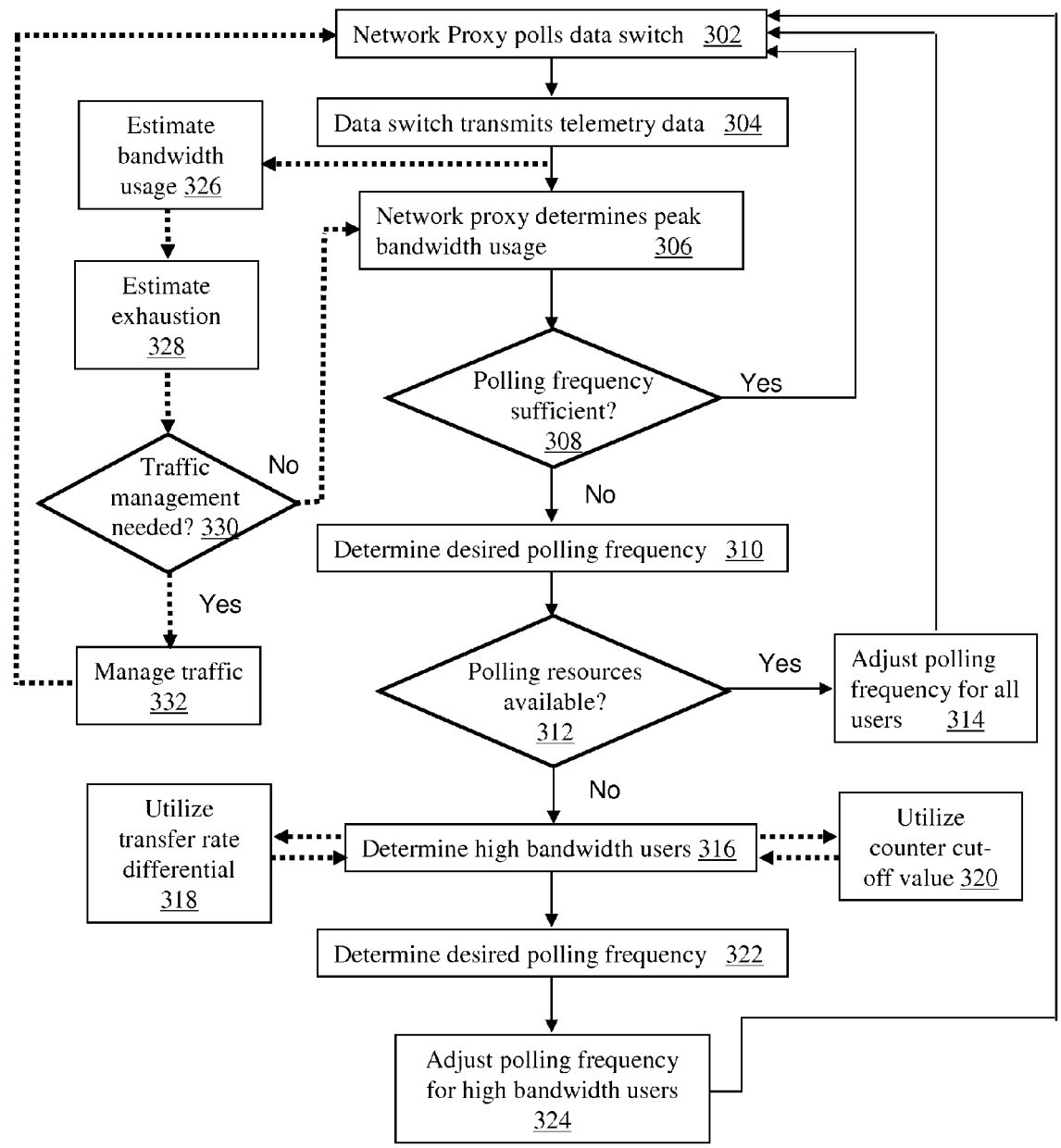
FIG. 3 depicts an exemplary method operating in one or more of the communication systems of FIGS. 1 and 2.

FIG. 3 depicts an exemplary method 300 operating in portions of the communication systems 100 and/or 200. Method 300 has variants as depicted by the dashed lines. It would be apparent to an artisan with ordinary skill in the art that other embodiments not depicted in FIG. 3 are possible without departing from the scope of the claims described below.

Method 300 can begin with step 302 in which the network proxy 122 polls the data switch 110 for telemetry data regarding bandwidth usage for the data switch and for users of the data switch. The telemetry data can include a count of cells, packets, bits or some other unit (collectively referred to as "cell counts") transmitted by the data switch 110 to each of the one or more users, as read by the counter 130 of the data switch. The present disclosure also contemplates collection of the cell count or telemetry data associated with the data switch 110 and/or the users of that data switch from other network elements in communication with the data switch, such as an ATM switch or ISP router.

In step 304, the data switch 110 can transmit the cell count to the network proxy 122. The network proxy 122 in step 306 can determine a peak bandwidth usage for each of the users associated with the data switch 110. In step 308, the network proxy 122 can determine whether the polling frequency is sufficient so that the counter 130 does not rollover in between polls. For example, the network proxy 122 can utilize the peak bandwidth usage of each user to determine whether the cell count could exceed the maximum counting capability of the counter 130, i.e., the rollover limit. By utilizing the peak bandwidth for each of the users, the network proxy 122 incorporates a safety factor into the estimation of whether a rollover can occur.

If in step 308 the polling frequency is sufficient, then the network proxy 122 can continue to poll at the current polling frequency. If on the other hand, the network proxy 122 determines that the current polling frequency is not sufficient to avoid reaching the rollover limit of the counter 130 in between polls, then the network proxy can determine a desired polling frequency for each of the users of the data switch 110 that would be sufficient to avoid reaching the rollover limit, as in step 310.

The network proxy 122 can determine in step 312 whether polling resources are available to perform the polling activity at the desired polling frequency. For example, if a single DSLAM with a low number of users needs to be polled, then network proxy 122 could have the available resources to perform increased polling activity. The available resources can be measured by a number of factors including processor capacity, storage capacity, and network traffic congestion. However, a large increase in polling frequency resulting in more polling activity may be deemed an inefficient use of the resources of the network proxy 122, where the network proxy can determine that the polling resources are not available. Limits can be set for the desired polling frequency.

If the network proxy 122 determines that polling resources are available to poll each of the users according to the desired polling frequency, then the polling frequency can be increased to the desired polling frequency, as in step 314. If on the other hand, the polling resources are not available, then in step 316 the network proxy 122 can determine which of the users of the data switch 110 are the higher bandwidth users. The determination of higher bandwidth users can be based at least in part on the peak bandwidth usage of each of the users, as determined back in step 306.

In one embodiment in step 318, the higher bandwidth users can be determined by polling users for cell counts in only one direction. For example, in certain instances the network proxy 122 can assume that if a user has a high bandwidth usage in one direction, e.g., an upstream direction, then the user will also have a high bandwidth usage in the other direction, e.g., a downstream direction. Where a differential in data transfer rates in the upstream and downstream directions exists for the one or more users of the data switch 110, the lower data transfer rate direction, e.g., upstream, can be polled to identify the high bandwidth users in the upstream direction, and it can be assumed that these are also the high bandwidth users in the downstream direction.

In another embodiment in step 320, a cut-off value for the cell count can be determined and only those users having estimated bandwidth usage over the cut-off value can be considered the high bandwidth users. The cut-off value can be applied in one or both directions. In one embodiment, the cut-off value can be adjusted based upon the type of bandwidth usage, for example transmission of asymmetric data, such as along an asymmetric digital subscriber line (ADSL) can have a different cut-off value as compared to transmission of symmetric data, such as along a T1 line.

In step 322, the network proxy 122 can determine a desired polling frequency for the high bandwidth users. The present disclosure also contemplates the desired polling frequency for the high bandwidth users being the same as the desired polling frequency determined for all of the users back in step 310. The polling frequency for the high bandwidth users can then be adjusted to the desired polling frequency in step 324 to avoid reaching a rollover limit of the counter 130.

In one embodiment in step 326, an estimated bandwidth usage for the data switch 110 and/or the users of the data switch can be determined by the network proxy 122 in step 326 based upon the telemetry data. The estimated bandwidth usage can be utilized in various algorithms and other predictive models to estimate a time of bandwidth exhaustion for the data switch 110. In step 330, it can be determined whether management of the network traffic is necessitated due to the time of bandwidth exhaustion for the data switch 110. If traffic management is needed, then in step 332 it can be performed, such as the data switch 110 being augmented with bandwidth and/or one or more users, e.g., the high bandwidth users, being transferred to another data switch. After traffic management is performed, a new estimate of the time for bandwidth exhaustion of the data switch 110 can be calculated based upon the polling steps 302-324 described above. If on the other hand, it is determined that traffic management is not needed at this time, then the network proxy can determine peak bandwidth usage for each of the users as recited back in step 306.

From the foregoing descriptions, it would be evident to an artisan with ordinary skill in the art that the aforementioned embodiments can be modified, reduced, or enhanced without departing from the scope and spirit of the claims described below. For example, polling and the process described above for increasing polling frequency to avoid reaching a rollover limit can be performed on a plurality of data switches 110. With this configuration, the bandwidth load balancing and bandwidth augmentation techniques can be improved further, such as by transferring users to data switches 110 that have more capacity. Polling frequency can be increased for higher bandwidth users of only those data switches that are approaching exhaustion. As another example, the polling requests and telemetry calculations can be performed by network elements other than the network proxy 122, including the data switch 110 itself. These are but a few examples of the modifications that can be applied to the present disclosure without departing from the scope of the claims. Accordingly, the reader is directed to the claims for a fuller understanding of the breadth and scope of the present disclosure.

Figure 4:
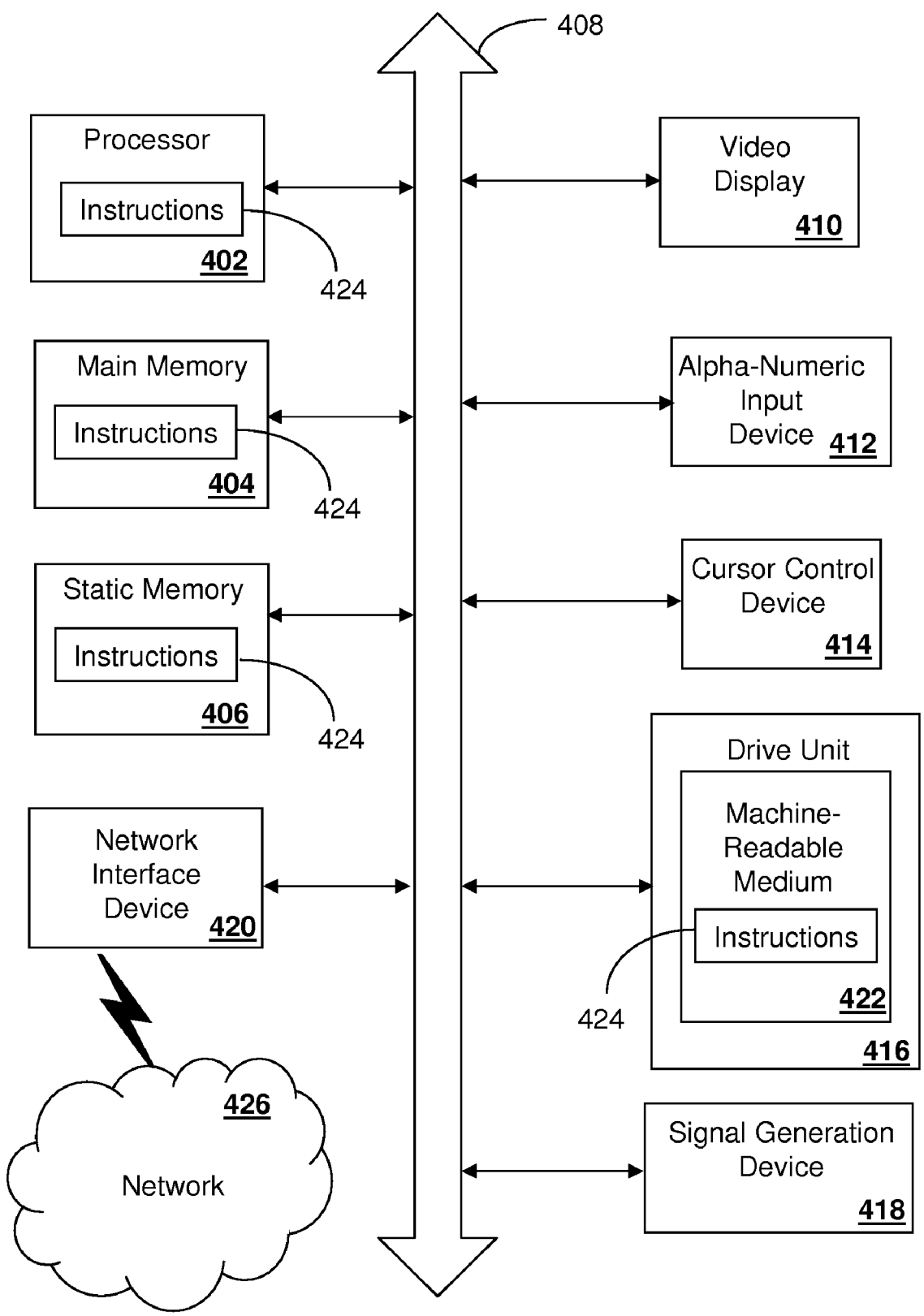
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a mass storage medium 416, a signal generation device 418 (e.g., a speaker or remote control) and a network interface device 420.

The mass storage medium 416 may include a computer-readable storage medium 422 on which is stored one or more sets of instructions (e.g., software 424) embodying any one or more of the methodologies or functions described herein, including those methods illustrated above. The computer-readable storage medium 422 can be an electromechanical medium such as a common disk drive, or a mass storage medium with no moving parts such as Flash or like non-volatile memories. The instructions 424 may also reside, completely or at least partially, within the main memory 404, the static memory 406, and/or within the processor 402 during execution thereof by the computer system 400. The main memory 404 and the processor 402 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the computer-readable storage medium 422 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include: computer-readable storage medium; solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium in a network proxy of a communication system, the storage medium being embedded with computer instructions for causing a computing device to perform the steps of:

polling a data switch according to a polling frequency to determine bandwidth usage of one or more users of the communication system;

determining a peak bandwidth of each of the one or more users based at least in part on the bandwidth usage;

identifying higher bandwidth users of the one or more users based at least in part on the peak bandwidth;

increasing the polling frequency for at least one of the higher bandwidth users to determine an estimated bandwidth usage and to avoid a rollover of a telemetry counter; and determining the at least one higher bandwidth users for increased polling frequency based at least in part on a differential in upstream and downstream data transfer rates for the one or more users.

2. The computer readable storage medium of claim 1, further comprising computer instructions for managing traffic for the data switch based at least in part on the estimated bandwidth usage.

3. The computer readable storage medium of claim 1, wherein the managing of traffic for the data switch comprises at least one among augmenting bandwidth of the data switch and transferring at least one of the one or more users to another data switch.

4. The computer readable storage medium of claim 3, wherein the at least one of the one or more users transferred to the other data switch is one or more of the at least one higher bandwidth users.

5. The computer readable storage medium of claim 1, further comprising computer instructions for:
monitoring other bandwidth usage of one or more other data switches; and
transferring at least one of the one or more users to the one or more other data switches based at least in part on the other bandwidth usage.

6. The computer readable storage medium of claim 5, further comprising computer instructions for:
polling one or more other data switches to determine the other bandwidth usage;
identifying other higher bandwidth users of the one or more other data switches; and
increasing the polling frequency for at least one of the other higher bandwidth users.

7. The computer readable storage medium of claim 1, further comprising computer instructions for:
determining whether a desired polling frequency exceeds a polling frequency limit; and
increasing the polling frequency for the at least one of the higher bandwidth users while the increased polling frequency is less than the polling frequency limit.

8. A data switch, comprising:
a counter for monitoring or collecting telemetry data for the data switch;
wherein the data switch is configured to transmit telemetry data representative of bandwidth usage by one or more users of the data switch,
wherein traffic for the data switch is managed based at least in part on the bandwidth usage by higher bandwidth users of the data switch, and
wherein at least one higher bandwidth user has an increased polling frequency based at least in part on a differential in upstream and downstream data transfer rates for the one or more users.

9. The data switch of claim 8, wherein a network proxy manages traffic for the data switch according to at least one among augmenting bandwidth of the data switch and transferring at least one of the one or more users to another data switch.

10. The data switch of claim 9, wherein other bandwidth usage of the another switch is monitored, and wherein the transferring of the at least one of the one or more users to the another data switch is based at least in part on the other bandwidth usage.

11. The data switch of claim 8, wherein a peak bandwidth of each of the one or more users is determined based at least in part on the bandwidth usage, and wherein the higher bandwidth users are determined based at least in part on the peak bandwidth.

12. The data switch of claim 8, wherein the telemetry data is transmitted in response to a request by a network proxy according to a polling frequency of the network proxy.

13. The data switch of claim 12, wherein a peak bandwidth of each of the one or more users is determined based at least in part on the bandwidth usage, wherein the higher bandwidth users are determined based at least in part on the peak bandwidth, and wherein the polling frequency is increased for at least one of the higher usage users so long as the polling frequency does not exceed a polling frequency limit.

14. A method of managing network traffic comprising:
with a counter, monitoring bandwidth usage of one or more users of a data switch to at least in part avoid a rollover of a telemetry counter;
performing traffic management based at least in part on the bandwidth usage monitored with the counter according to at least one among augmenting bandwidth of the data switch and transferring at least one of the one or more users to another data switch; and
determining a differential in upstream and downstream data transfer rates for the one or more users based at least in part on the peak bandwidth, wherein the at least one higher bandwidth users for increased polling frequency is determined based at least in part on the differential.

15. The method of claim 14, wherein the traffic management for the data switch is based at least in part on the bandwidth usage by higher bandwidth users of the one or more users of the data switch.

16. The method of claim 15, further comprising:
determining a peak bandwidth of each of the one or more users based at least in part on the bandwidth usage; and
determining the higher bandwidth users based at least in part on the peak bandwidth.

17. The method of claim 15, wherein the monitoring of the bandwidth usage comprises polling according to a polling frequency.

18. The method of claim 17, further comprising:
determining a peak bandwidth of each of the one or more users based at least in part on the bandwidth usage;
determining the higher bandwidth users based at least in part on the peak bandwidth; and
increasing the polling frequency for at least one of the higher bandwidth users while the polling frequency is less than a desired polling frequency.

19. The method of claim 18, further comprising:
determining whether the desired polling frequency exceeds a polling frequency limit; and
increasing the polling frequency for the at least one of the higher bandwidth users while the desired polling frequency is less than the polling frequency limit.

20. The method of claim 14, further comprising:
monitoring one or more other data switches for other bandwidth usage, wherein the transferring of the at least one of the one or more users to another data switch is based at least in part on the other bandwidth usage.

21. The method of claim 20, further comprising:
polling the one or more other data switches to determine the other bandwidth usage;
determining other higher bandwidth users of the one or more other data switches; and increasing the polling frequency for at least one of the other higher bandwidth users.

* * * * *